Sept. 11, 1934.    H. SWAN ET AL    1,973,548
POSITIVELY MOLDED MATRIX

Filed July 2, 1929

INVENTOR.
H. Swan & S. Higgins
BY
Jos. H. Nielsen
ATTORNEYS.

Patented Sept. 11, 1934

1,973,548

UNITED STATES PATENT OFFICE 1,973,548

POSITIVELY MOLDED MATRIX

Hylton Swan, Upper Montclair, and Sigfried Higgins, Verona, N. J., assignors to Bakelite Corporation, New York, N. Y., a corporation of Delaware Application July 2, 1929, Serial No. 375,578

5 Claims. (Cl. 41—25)

This invention relates to matrices for the manufacture of printing plates and the like and to methods of preparing them.

Phenolic resinoid compositions are particularly advantageous for the molding of printing plates on account of their strength, light weight, durability, fidelity in reproduction, etc., and for similar reasons they are highly desirable for the production of matrices from which printing plates are to be molded. These resinoid compositions are obtained by the addition of fillers, such as wood-flour, blotting paper, etc. to phenolic resinoids, that is, condensation products which result from the reaction of a phenol and formaldehyde or their equivalents and which have the property of changing from an initial fusible or reactive condition to an infusible one upon the application of heat. However, in the molding of resinoid compositions against a resinoid matrix to produce a printing plate there is the difficulty of sticking or anchoring. Accordingly it is customary to face the matrix with a parting medium such as tin or lead foil or metal alloys, the resinoid composition thus serving as a backing material on the reverse side of this metal sheet.

In the procedure heretofore generally followed in the manufacture of matrices from phenolic compositions the parting medium or facing sheet that has been used comprises thin sheet lead, lead alloys, tin or other soft metal which is placed on the original printing plate, type form, cut, half-tone, etching or engraving to be reproduced. A heavy pressure is applied to the lead or other soft metal sheet through the help of a yielding material, such as layers of paper, in order to force it into intimate contact with the original and obtain the requisite definition; pressures in the neighborhood of from 7,000 to 14,000 pounds to the square inch are usually found necessary, though the application of pressures of this magnitude are likely to cause injury to the original. After this operation the metal facing sheet is backed with a reactive resinoid composition in sheet form, usually paper or linen sheets impregnated with a resinoid varnish. Heat is simultaneously applied with pressure whereby the composition backing is caused to fill the depressions made in the facing, the heat acting to first soften and then to set the backing to the infusible condition. Matrices prepared by this method of open or flash type of molding however are found to have defects which become apparent when used in the molding of printing plates, for the matrices yield at the edges and in those spots where the backing is of less density with the result that the molded printing plates have high edges and unevenness of printing surface. We have determined that these defects are due to the tendency of the resinoid backing to flow while in the softened condition along the lines of least resistance, that is, in a lateral direction over those portions of the facing that provide no obstructions, and to extrude at the unconfined edges resulting in a loss of effective pressure and consequent non-uniform density in the backing.

According to the present invention backings of substantially uniform density are obtainable thus obviating the danger of distortion and formation of high edges in printing plates molded therefrom. In addition substantial reductions in the pressures necessary to sharp and uniform definitions are made possible, thereby enabling the use of comparatively light and inexpensive press equipment and providing economy both of time and of operation.

Briefly stated the invention comprises confining the backing material against lateral flow during a molding operation by the use of a "positive" or closed mold. As well understood in the molding art, this type of mold confines the heat softened moldable material and prevents its escape even though high pressures, for instance 1500 or 2000 lbs. per square inch are used. As a further improvement we have found it preferable to use a backing material in a powdered or granulated condition. Pressure applied to a material so confined approaches a nearly hydrostatic condition during the period when the material is in a softened condition caused by the heating which is applied simultaneously with the pressure. The pressures are thereby directed with full effect against the facing sheet which insures a uniform and sharp definition, and as the flow is practically restricted to the direction of applied pressure substantially uniform density is likewise obtained.

In the accompanying drawing

Figure 1:
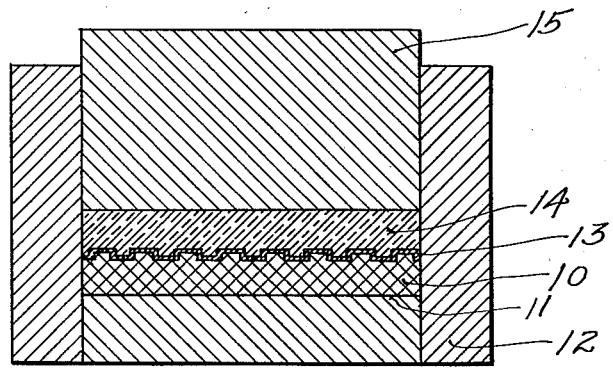
Fig. 1 illustrates in vertical cross section a positive mold assembly.
Figure 2:
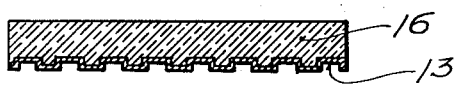
Fig. 2 is a vertical cross section of a molded matrix.

In the manufacture of a matrix in accordance with this invention the original printing plate 10 or other matter being duplicated is placed in the bottom 11 of a positive mold 12 and the facing medium 13 which may be sheet lead or other suitable material, is placed over it. In the case of a lead or soft metal facing it is preferable to compress it against the original and thus secure a close contact by the preliminary application of pressures which only need to be moderate, of the order of about 1000 pounds or so to the square inch. A suitable amount of a reactive resinoid composition 14 preferably in a powdered condition is then charged into the mold, and after the plunger or force 15 is positioned within the chase the entire assembly is submitted to heat and pressure. The pressures required may vary from 500 or 600 pounds to the square inch up to about 1500 or 2000 pounds or more to the square inch, depending upon the nature of the original; with a charge providing a molding backing of about ¼" to ⅜" thickness and heated to about 135° C. the period required is about 10 to 15 minutes. After this operation the mold is preferably cooled while still under pressure and it is then disassembled. The matrix 16 so obtained is in condition for the manufacture of printing plates.

Suitable compositions for the manufacture of matrices in accordance with this invention comprise the usual mixtures of a phenolic resinoid and wood-flour or the other usual fillers. However, it is found that compositions containing inert fillers, such as asbestos or powdered mica are preferable as there is less shrinkage and yield with such fillers as compared with the wood-flour compositions during a molding operation and the rigidity of the molded product is better. The proportion of mica or asbestos to resinoid used is about equal parts by volume of the filler and the resinoid; but the relative proportions can be varied within wide limits and still yield a moldable composition.

When the matrices are used for the manufacture of printing plates from substances such as rubber, celluloid, etc. it is not essential though desirable that the metallic facing sheet be incorporated just as in the preparation of matrices to be used for printing plates from phenolic resinoids. Accordingly it is to be understood that the invention is not restricted to the inclusion of parting media but is to be given a construction commensurate with the appended claims.

We claim:

1. Matrix suitable for printing plates comprising a phenolic resinoid composition molded into negative printing areas and having incorporated therewith a filler of inert nature, the matrix being characterized by a substantial uniformity of density at the periphery and at the interior portions whereby it is adapted for the molding of printing plates free from high edges and unevenness of printing surface.

2. In the art of printing the method which comprises molding a reactive phenolic resinoid composition in substantial contact with an original under the action of heat and pressure while confining the composition against lateral flow within a positive mold to form a matrix characterized by a substantial uniformity of density at the periphery and the interior portions to adapt it for the molding of a printing plate free from high edges and uneven surface.

3. Matrix suitable for printing plates comprising a phenolic resinoid composition molded into negative printing areas and having incorporated therewith a finely divided inert filler, the matrix being characterized by a substantial uniformity of density at the periphery and at the interior portions whereby it is adapted for the molding of printing plates free from high edges and unevenness of printing surfaces.

4. Matrix suitable for printing plates comprising a homogeneous phenolic resinoid composition molded into negative printing areas and having incorporated therewith an inert filler, the matrix being characterized by a substantial uniformity of density at the periphery and at the interior portion whereby it is adapted for the molding of printing plates free from high edges and unevenness of printing surfaces.

5. In the art of making a matrix for printing plates, the method which comprises molding a comminuted composition comprising a heat reactive phenolic resinoid and a filler, in substantial contact with an original under the action of heat and pressure while confining the composition against lateral flow within a positive mold to form a matrix characterized by a substantial uniformity of density at the periphery and the interior portions to adapt it for the molding of a printing plate free from high edges and uneven surfaces.

HYLTON SWAN.
SIGFRIED HIGGINS.